US012094198B2

(12) United States Patent
Tian et al.

(10) Patent No.: US 12,094,198 B2
(45) Date of Patent: Sep. 17, 2024

(54) CLOUD PLATFORM-BASED GARLIC CROP RECOGNITION METHOD BY COUPLING ACTIVE AND PASSIVE REMOTE SENSING IMAGES

(71) Applicant: Henan University, Kaifeng (CN)

(72) Inventors: Haifeng Tian, Kaifeng (CN); Yaochen Qin, Kaifeng (CN); Wei Shen, Kaifeng (CN); Boyan Zhou, Kaifeng (CN); Yongjiu Wang, Kaifeng (CN)

(73) Assignee: Henan University, Kaifeng (CN)

( * ) Notice: Subject to any disclaimer, the term of this patent is extended or adjusted under 35 U.S.C. 154(b) by 445 days.

(21) Appl. No.: 17/531,826

(22) Filed: Nov. 22, 2021

(65) Prior Publication Data

US 2022/0092306 A1 Mar. 24, 2022

Related U.S. Application Data

(63) Continuation of application No. PCT/CN2021/097839, filed on Jun. 2, 2021.

(30) Foreign Application Priority Data

Sep. 21, 2020 (CN) .......................... 202010995102.7

(51) Int. Cl.
G06V 20/10 (2022.01)
G01S 13/90 (2006.01)
(Continued)

(52) U.S. Cl.
CPC ........ G06V 20/188 (2022.01); G01S 13/9004 (2019.05); G01S 13/9027 (2019.05);
(Continued)

(58) Field of Classification Search
CPC .............. G06V 20/188; G01S 13/9004; G01S 13/9027; G01S 19/14; G06F 18/21;
(Continued)

(56) References Cited

U.S. PATENT DOCUMENTS

| 2020/0184194 A1* | 6/2020 | Edara .................... G06V 20/647 |
| 2021/0110157 A1* | 4/2021 | Sinha ..................... G06F 18/251 |
| 2021/0235612 A1* | 8/2021 | Tewari ................... G06Q 50/02 |

FOREIGN PATENT DOCUMENTS

| CN | 106897707 A | 6/2017 |
| CN | 110751727 A | 2/2020 |

(Continued)

OTHER PUBLICATIONS

Y. Guo, H. Xia, X. Zhao, L. Qiao, Q. Du and Y. Qin, "Early-Season Mapping of Winter Wheat and Garlic in Huaihe Basin Using Sentinel-1/2 and Landsat-7/8 Imagery," in IEEE Journal of Selected Topics in Applied Earth Observations and Remote Sensing, vol. 16, pp. 8809-8817, 2023. (Year: 2023).*

(Continued)

*Primary Examiner* — Kathleen Y Dulaney
(74) *Attorney, Agent, or Firm* — Bayramoglu Law Offices, LLC

(57) ABSTRACT

A cloud platform-based garlic crop recognition method by coupling active and passive remote sensing images includes: firstly, obtaining an optical satellite remote sensing image based on phenological characteristics of garlic, and constructing a decision tree model for optical image recognition of the garlic by combining geographic coordinate information of the garlic, so as to obtain an optical distribution diagram of the garlic; secondly, obtaining radar image characteristics of the garlic and winter wheat based on a synthetic aperture radar satellite, and constructing a decision tree model for radar image recognition of the garlic by combining the geographic coordinate information of the garlic, so as to obtain a radar distribution diagram of the garlic; and finally, coupling the optical distribution diagram of the garlic with the radar distribution diagram of the garlic, i.e., selecting an intersection of the two distribution dia- (Continued)

grams to complete remote sensing recognition drawing of the garlic.

9 Claims, 3 Drawing Sheets

(51) Int. Cl.
G01S 19/14 (2010.01)
G06F 18/21 (2023.01)
G06F 18/243 (2023.01)
G06F 18/25 (2023.01)
G06N 5/02 (2023.01)

(52) U.S. Cl.
CPC .............. *G01S 19/14* (2013.01); *G06F 18/21* (2023.01); *G06F 18/24323* (2023.01); *G06F 18/256* (2023.01); *G06N 5/02* (2013.01)

(58) Field of Classification Search
CPC ... G06F 18/24323; G06F 18/256; G06N 5/02; G06N 5/01

USPC .......................................................... 382/110
See application file for complete search history.

(56) References Cited

FOREIGN PATENT DOCUMENTS

| CN | 111652193 A | 9/2020 |
| CN | 111666815 A | 9/2020 |
| CN | 112101256 A | 12/2020 |
| WO | 2019008570 A1 | 1/2019 |

OTHER PUBLICATIONS

H. Zhang, F. Xiao, W. He, Z. Chai and H.-T. Ewe, "Multiyear Automated Mapping and Price Analysis of Garlic in Main Planting Areas of China Using Time-Series Remote Sensing Images," in IEEE Journal of Selected Topics in Applied Earth Observations and Remote Sensing, vol. 15, pp. 5222-5233, 2022. (Year: 2022).*

* cited by examiner

CLOUD PLATFORM-BASED GARLIC CROP RECOGNITION METHOD BY COUPLING ACTIVE AND PASSIVE REMOTE SENSING IMAGES

CROSS REFERENCE TO THE RELATED APPLICATIONS

This application is the continuation application of International Application No. PCT/CN2021/097839, filed on Jun. 2, 2021, which is based upon and claims priority to Chinese Patent Application No. 202010995102.7, filed on Sep. 21, 2020, the entire contents of which are incorporated herein by reference.

TECHNICAL FIELD

The present invention relates to the technical field of remote sensing target recognition, and more particularly, to a cloud platform-based garlic crop recognition method by coupling active and passive remote sensing images.

BACKGROUND

Garlic crops and winter wheat crops are both overwintering crops and have similar growth periods and spectral characteristics. It is difficult to accurately distinguish the garlic crops from the winter wheat crops by relying solely on optical satellite images. Compared with the winter wheat crops, the garlic crops have a limited sowing area, and garlic plots are mostly staggered with winter wheat plots, which further reduces the accuracy of garlic crop remote sensing recognition. How to accurately distinguish the garlic crops from the winter wheat crops through satellite images is one of the difficulties in the field of crop remote sensing recognition.

The processing of remote sensing big data is complicated and involves a huge amount of data calculation, which far exceeds the data processing capacity of personal computers. The Google Earth Engine cloud computing platform integrates remote sensing data available publicly around the world and provides personalized data processing services. Users only need to program and run the relevant data processing algorithms in the Google Earth Engine language, and Google Earth Engine automatically calls Google's tens of thousands of servers in the background and quickly completes data processing tasks through parallel computing and feeds back the results to users. Google Earth Engine solves the problem of remote sensing big data processing, and provides an opportunity and platform for the automation and business operation of crop remote sensing recognition.

SUMMARY

In view of the deficiencies in the background art, the present invention provides a cloud platform-based garlic crop recognition method by coupling active and passive remote sensing images, so as to solve the technical problem that garlic crops cannot be accurately recognized in the existing remote sensing recognition technology.

A technical solution of the present invention is realized as follows.

A cloud platform-based garlic crop recognition method by coupling active and passive remote sensing images includes the following steps:

S1: retrieving moderate resolution imaging spectroradiometer (MODIS)-normalized difference vegetation index (NDVI) time series images of main garlic crop production areas in a target year on a Google Earth Engine cloud computing platform to obtain phenological information of garlic crops and other forest and grass vegetation according to the MODIS-NDVI time series images;

S2: retrieving Sentinel-2 time series images and Landsat-8 time series satellite images of the main garlic crop production areas in the target year on the Google Earth Engine cloud computing platform to obtain an optically synthetic image data set by combining the phenological information of the garlic crops;

S3: obtaining and recording geographic coordinate information of the garlic crops and winter wheat crops in the main garlic crop production areas by a hand-held global position system (GPS);

S4: constructing a decision tree model for optical image recognition of the garlic crops based on the optically synthetic image data set obtained in step S2 and the geographic coordinate information of the garlic crops obtained in step S3;

S5: classifying the optically synthetic image data set obtained in step S2 according to the decision tree model for optical image recognition of the garlic crops obtained in step S4 to obtain an optical distribution diagram of the garlic crops;

S6: retrieving Sentinel-1 time series synthetic aperture radar satellite images of the main garlic crop production areas in the target year on the Google Earth Engine cloud computing platform to obtain radar image characteristics of the garlic crops and the winter wheat crops by combining the geographic coordinate information of the garlic crops and the winter wheat crops obtained in step S3;

S7: obtaining a radar synthetic image data set according to the image characteristics of the garlic crops and the winter wheat crops in step S6;

S8: constructing a decision tree model for radar image recognition of the garlic crops according to the radar synthetic image data set obtained in step S7 and the geographic coordinate information of the garlic crops obtained in step S3;

S9: classifying the radar synthetic image data set obtained in step S7 according to the decision tree model for radar image recognition of the garlic crops obtained in step S8 to obtain a radar distribution diagram of the garlic crops; and S10: coupling the radar distribution diagram of the garlic crops in step S9 with the optical distribution diagram of the garlic crops in step S5 on the Google Earth Engine cloud computing platform to obtain remote sensing-based recognition results of the garlic crops.

A method for obtaining the optically synthetic image data set may include: in a time period when a time series MODIS-NDVI of the garlic crops is higher than a time series MODIS-NDVI of other forest and grass vegetation, extracting a maximum value of NDVI of Sentinel-2 time series images at a position of a pixel i as a pixel value of the pixel i, and traversing all positions of pixels of the Sentinel-2 time series images successively to obtain a maximum value synthetic image of NDVI to be recorded as $NDVI_{max}$; in a time period when the time series MODIS-NDVI of the garlic crops is lower than the time series MODIS-NDVI of other forest and grass vegetation, extracting a minimum value of NDVI of Sentinel-2 and Landsat-8 time series images at the position of the pixel i as the pixel value of the pixel i, and traversing all the positions of the pixels of the Sentinel-2 and Landsat-8 time series images successively to obtain a minimum value synthetic image of NDVI to be recorded as $NDVI_{min}$; in a time period when the time series MODIS-NDVI of the garlic crops is lower than the time series MODIS-NDVI of other forest and grass vegetation, extracting a median value of NDVI of Sentinel-2 and Landsat-8 time series satellite images at the position of the pixel i as the pixel value of the pixel i, and traversing all the positions of the pixels of the Sentinel-2 and Landsat-8 time series satellite images successively to obtain a median value synthetic image of NDVI to be recorded as $NDVI_{med}$; and combining the maximum value synthetic image $NDVI_{max}$ of NDVI, the minimum value synthetic image $NDVI_{min}$ of NDVI, and the median value synthetic image $NDVI_{med}$ of NDVI into the optically synthetic image data set.

A method for constructing the decision tree model for optical image recognition of the garlic crops may include: obtaining a threshold α of a median pixel value according to distribution of the median value synthetic image $NDVI_{med}$ of NDVI on the geographic coordinate position of the garlic crops; obtaining a first threshold γ of a maximum pixel value and a second threshold β of the maximum pixel value according to distribution of the maximum value synthetic image $NDVI_{max}$ of NDVI on the geographic coordinate position of the garlic crops; obtaining a threshold δ of a minimum pixel value according to distribution of the minimum value synthetic image $NDVI_{min}$ of NDVI on the geographic coordinate position of the garlic crops; and obtaining the decision tree model for optical image recognition of the garlic crops according to the threshold α of the median pixel value, the first threshold γ of the maximum pixel value, the second threshold β of the maximum pixel value and the threshold δ of the minimum pixel value.

A method for obtaining the optical distribution diagram of the garlic crops may include: constructing a first constraint condition of the garlic crops as $$\begin{cases} NDVI_{med,i} < \alpha \\ NDVI_{max,i} > \beta \\ NDVI_{min,i} < \frac{1}{2} NDVI_{max,i} \end{cases} \text{ or } \begin{cases} NDVI_{med,i} < \alpha \\ \gamma < NDVI_{max,i} \leq \beta \\ NDVI_{min,i} < \delta \end{cases}$$

according to the decision tree model for optical image recognition of the garlic crops; and respectively screening pixels in the maximum value synthetic image $NDVI_{max}$ of NDVI, the median value synthetic image $NDVI_{med}$ of NDVI and the minimum value synthetic image $NDVI_{min}$ of NDVI according to the first constraint condition of the garlic crops to obtain the optical distribution diagram of the garlic crops. $NDVI_{max,i}$ may represent a pixel value of an $i^{th}$ pixel in the maximum value synthetic image $NDVI_{max}$ of NDVI, $NDVI_{med,i}$ may represent a pixel value of an $i^{th}$ pixel in the median value synthetic image $NDVI_{med}$ of NDVI, and may represent a pixel value of an $i^{th}$ pixel in the minimum value synthetic image $NDVI_{min}$ of NDVI.

A method for obtaining the radar synthetic image data set may include: in an overwintering period of winter wheat, synthesizing a median image of Sentinel-1 synthetic aperture radar satellite images to be recorded as an $SVV1_{med}$ synthetic image; in a tillering period to a booting period of the winter wheat, synthesizing a median image of the Sentinel-1 synthetic aperture radar satellite images to be recorded as an $SVV2_{med}$ synthetic image; and combining the $SVV1_{med}$ synthetic image and the $SVV2_{med}$ synthetic image into the radar synthetic image data set.

A method for constructing the decision tree model for radar image recognition of the garlic crops may include: obtaining a differential threshold ε and a threshold according to distributions of the $SVV1_{med}$ synthetic image and the $SVV2_{med}$ synthetic image on the geographic coordinate position of the garlic crops; and obtaining the decision tree model for radar image recognition of the garlic crops according to the differential threshold ε and the threshold ζ.

A method for obtaining the radar distribution diagram of the garlic crops may include: constructing a second constraint condition of the garlic crops as $$\begin{cases} SVV1_{med,i} - SVV2_{med,i} < \varepsilon \\ SVV2_{med,i} > \zeta \end{cases}$$

according to the decision tree model for radar image recognition of the garlic crops; and respectively screening pixels in the $SVV1_{med}$ synthetic image and the $SVV2_{med}$ synthetic image according to the second constraint condition of the garlic crops to obtain the radar distribution diagram of the garlic crops. $SVV1_{med,i}$ may represent a pixel value of an $i^{th}$ pixel in the $SVV1_{med}$ synthetic image, and $SVV2_{med,i}$ may represent a pixel value of an $i^{th}$ pixel in the $SVV2_{med}$ synthetic image.

A method for obtaining the final remote sensing-based recognition results of the garlic crops may include: when the pixel i is the garlic crops in the radar distribution diagram of the garlic crops and the optical distribution diagram of the garlic crops, determining that the pixel i is the garlic crops, and otherwise, determining that the pixel i is not the garlic crops; and traversing all pixels in the radar distribution diagram of the garlic crops and the optical distribution diagram of the garlic crops successively to complete the final remote sensing-based recognition of the garlic crops.

The present technical solution has the following beneficial effects:

(1) A garlic crop remote sensing automatic recognition model provided by the present invention takes full advantage of the sensitivity of response of time series optical images to the phenological characteristics of the garlic crops and the sensitivity of response of Sentinel-1 synthetic aperture radar images to the plant structure characteristics of the garlic crops and the winter wheat crops, realizing accurate remote sensing-based recognition of garlic crop distribution;

(2) The present invention can be transplanted to the Google Earth Engine cloud computing platform, avoiding the problem of remote sensing big data processing, which can realize automatic and rapid recognition of the garlic crops in a geographic space on a large-area scale, and provides a theoretical and technical foundation for remote sensing-based recognition of garlic crop distribution.

BRIEF DESCRIPTION OF THE DRAWINGS

To describe the technical solutions in the embodiments of the present invention or in the prior art more clearly, the following briefly describes the accompanying drawings required for describing the embodiments or the prior art. Accordingly, the accompanying drawings in the following description show merely some embodiments of the present invention, and a person of ordinary skill in the art may still derive other drawings from these accompanying drawings without creative efforts.

DETAILED DESCRIPTION OF THE EMBODIMENTS

The technical solutions of the embodiments of the present invention are clearly and completely described below with reference to the accompanying drawings. Accordingly, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
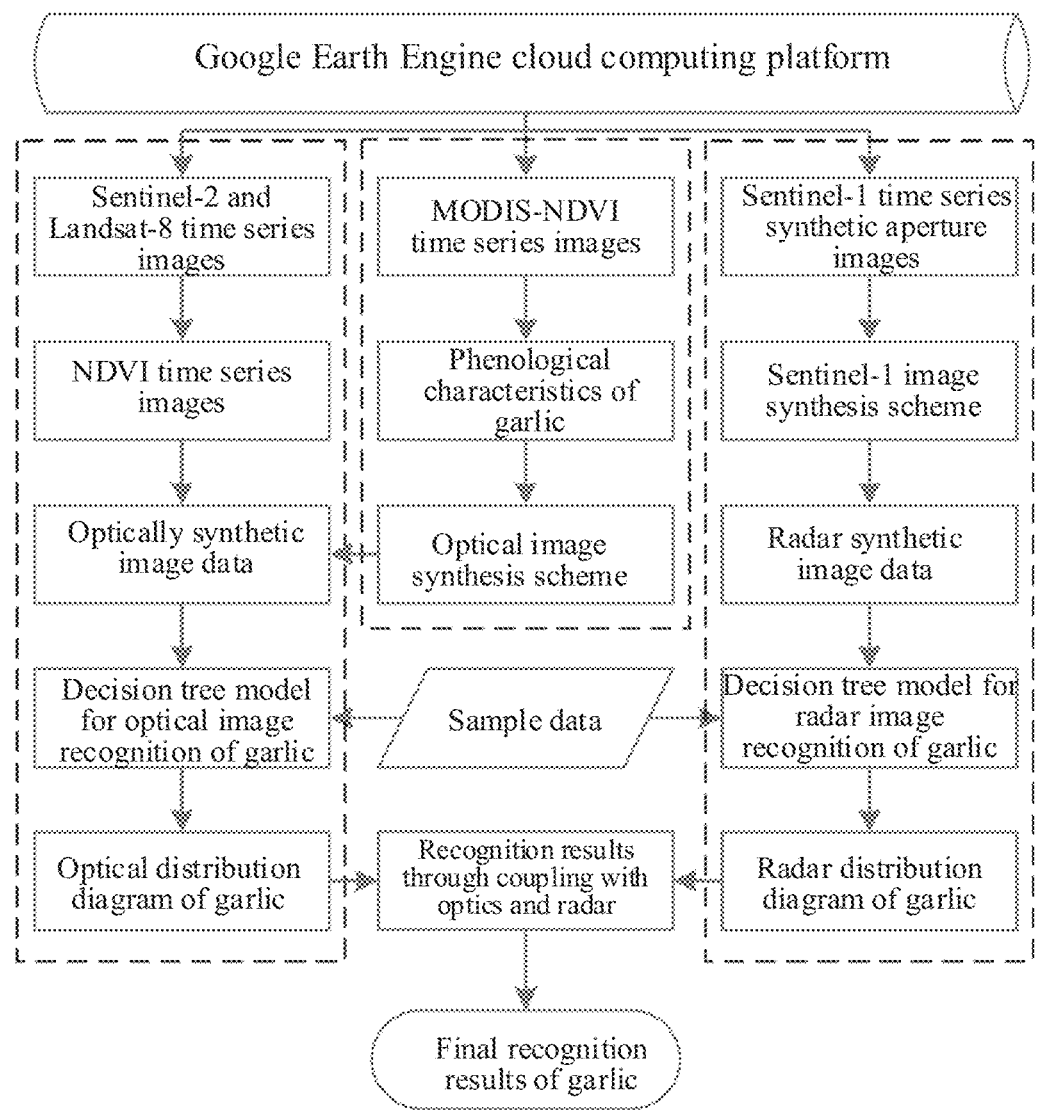
FIG. 1 is a flowchart of the present invention.

As shown in FIG. 1, the embodiments of the present invention provides a cloud platform-based garlic crop recognition method by coupling active and passive remote sensing images. The specific steps are as follows:

S1, MODIS-NDVI time series images of main garlic production areas in North China (the geographic coordinates are 34° N to 34.6° N and 113.5° E to 118.5° E) in a target year from Oct. 1, 2019 to Jun. 30, 2020 are retrieved on a Google Earth Engine cloud computing platform to obtain phenological information of garlic crops and other forest and grass vegetation according to the MODIS-NDVI time series images, so as to discover the uniqueness of the phenology of the garlic crops relative to the phenology of forest and grass vegetation (the uniqueness of the garlic crops is specifically as follows: from December to March of the following year, the garlic crops are in the growth or overwintering period, and the forest and grass vegetation is mostly in the deciduous and withering period (most of the forest and grass vegetation in the garlic planting area in North China is very green vegetation), and on satellite images, the NDVI of the garlic crops is higher than that of the forest and grass vegetation; and in the sowing and harvest period of the garlic, the garlic crops are in the early or late growth period, and the forest and grass vegetation is mostly in the vigorous growth period, and on the satellite images, the NDVI of garlic crops is lower than that of the forest and grass vegetation). Since the phenological information of winter wheat is similar to that of the garlic crops, the NDVI of the winter wheat crops in the present embodiment is similar to that of the garlic crops.

S2, Sentinel-2 time series images and Landsat-8 time series satellite images of the main garlic crop production areas in the target year are retrieved on the Google Earth Engine cloud computing platform to obtain an optically synthetic image data set by combining the phenological information of the garlic crops.

According to the uniqueness of the phenology of the garlic, a time series optical image synthesis scheme is designed to enhance the image information of the garlic. A method for obtaining the optically synthetic image data set is as follows: in a time period when a time series MODIS-NDVI of the garlic crops is higher than a time series MODIS-NDVI of other forest and grass vegetation (Dec. 1, 2019 to Mar. 20, 2020), a maximum value of NDVI of Sentinel-2 time series images at a position of a pixel i is extracted as a pixel value of the pixel i, and all positions of pixels of the Sentinel-2 time series images are traversed successively to obtain a maximum value synthetic image of NDVI to be recorded as $NDVI_{max}$; in a time period when the time series MODIS-NDVI of the garlic crops is lower than the time series MODIS-NDVI of other forest and grass vegetation (Oct. 1, 2019 to Oct. 30, 2019 and May 20, 2020 to Jun. 20, 2020), a minimum value of NDVI of Sentinel-2 time series images at the position of the pixel i is extracted as the pixel value of the pixel i, and all the positions of the pixels of the Sentinel-2 time series images are traversed successively to obtain a minimum value synthetic image of NDVI to be recorded as $NDVI_{min}$; in a time period when the time series MODIS-NDVI of the garlic crops is lower than the time series MODIS-NDVI of other forest and grass vegetation (Oct. 1, 2019 to Oct. 30, 2019 and May 20, 2020 to Jun. 20, 2020), a median value of NDVI of Sentinel-2 and Landsat-8 time series satellite images at the position of the pixel i is extracted as the pixel value of the pixel i, and all the positions of the pixels of the Sentinel-2 and Landsat-8 time series satellite images are traversed successively to obtain a median value synthetic image of NDVI to be recorded as $NDVI_{med}$. The maximum value synthetic image $NDVI_{max}$ of NDVI, the minimum value synthetic image $NDVI_{min}$ of NDVI, and the median value synthetic image $NDVI_{med}$ of NDVI are combined into the optically synthetic image data set. The synthetic images are all completed on the Google Earth Engine cloud computing platform.

S3, The experimenters arrive at the actual distribution locations of garlic and other ground features (including winter wheat plots, woodlands, residential areas, etc.), and use a hand-held GPS to obtain and record geographic coordinate information of the garlic crops and the winter wheat crops in main garlic crop production areas to complete sample acquisition work.

S4, A decision tree model for optical image recognition of the garlic crops is constructed based on the optically synthetic image data set obtained in step S2 and the geographic coordinate information of the garlic crops obtained in step S3. A distribution interval of 2600 pixel values of the maximum value synthetic image $NDVI_{max}$ of NDVI on the geographic coordinate position of the garlic crops is γ-1, but is concentrated in two sub-intervals, namely γ-β and β-1. The garlic in the interval y-β grows poorly or there is a phenomenon of mixed pixels, and the garlic in the interval β-1 grows well. Accordingly, a first threshold γ of a maximum pixel value and a second threshold β of the maximum pixel value are obtained. A distribution interval of the 2600 pixel values of the median value synthetic image $NDVI_{med}$ of NDVI on the geographic coordinate position of the garlic crops is 0-α, and accordingly, a threshold α of a median pixel value is obtained. A distribution interval of the 2600 pixel values of the minimum value synthetic image $NDVI_{min}$ of NDVI on the geographic coordinate position of the garlic crops is less than δ, and accordingly, a threshold δ of a minimum pixel value is obtained. The decision tree model for optical image recognition of the garlic crops is obtained according to the first threshold γ of the maximum pixel value, the second threshold β of the maximum pixel value, the threshold α of the median pixel value and the threshold δ of the minimum pixel value. In the present embodiment, α=0.51, β=0.48, γ=0.33, and δ=0.15.

S5, The optically synthetic image data set obtained in step S2 is classified according to the decision tree model for optical image recognition of the garlic crops obtained in step S4 to obtain an optical distribution diagram of the garlic crops.

Figure 2:
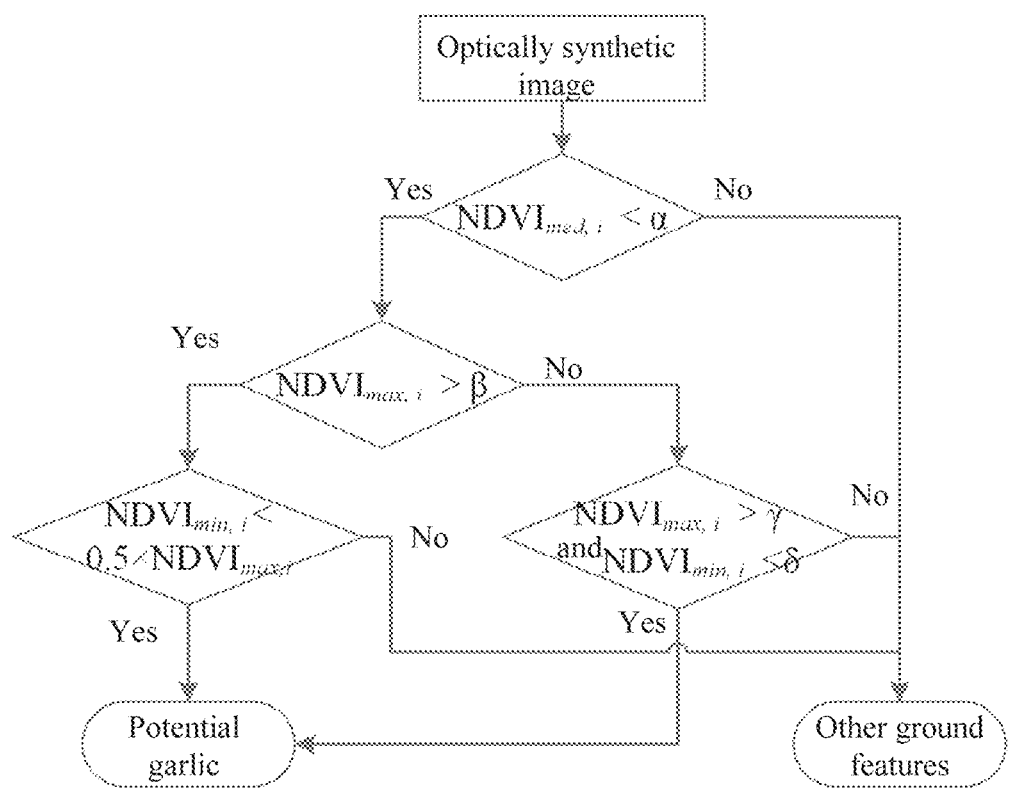
FIG. 2 is a decision tree model for optical image recognition of garlic crops of the present invention.

As shown in FIG. 2, a method for obtaining the optical distribution diagram of the garlic crops is as follows: a first constraint condition of the garlic crops, $$\begin{cases} NDVI_{med,i} < \alpha \\ NDVI_{max,i} > \beta \\ NDVI_{min,i} < \frac{1}{2} NDVI_{max,i} \end{cases} \text{ or } \begin{cases} NDVI_{med,i} < \alpha \\ \gamma < NDVI_{max,i} \leq \beta \\ NDVI_{min,i} < \delta \end{cases},$$

is constructed according to the decision tree model for optical image recognition of the garlic crops. Pixels in the maximum value synthetic image $NDVI_{max}$ of NDVI, the median value synthetic image $NDVI_{med}$ of NDVI and the minimum value synthetic image $NDVI_{min}$ of NDVI are respectively screened according to the first constraint condition of the garlic crops to obtain the optical distribution diagram of the garlic crops. $NDVI_{max,i}$ represents a pixel value of an $i^{th}$ pixel in the maximum value synthetic image $NDVI_{max}$ of NDVI, $NDVI_{med,i}$ represents a pixel value of an $i^{th}$ pixel in the median value synthetic image $NDVI_{med}$ of NDVI, and $NDVI_{min,i}$ represents a pixel value of an $i^{th}$ pixel in the minimum value synthetic image $NDVI_{min}$ of NDVI. The optical distribution diagram of the garlic crops is realized on the Google Earth Engine cloud computing platform.

S6, Sentinel-1 time series synthetic aperture radar satellite images of the main garlic crop production areas in the target year (Oct. 1, 2019 to Jun. 30, 2020) are retrieved on the Google Earth Engine cloud computing platform to obtain image characteristics of the garlic crops and the winter wheat crops by combining the geographic coordinate information of the garlic crops and the winter wheat crops obtained in step S3.

A method for obtaining the image characteristics of the garlic crops and the winter wheat crops is as follows: average values of pixel values of garlic crop samples and winter wheat crop samples in Sentinel-1 synthetic aperture radar satellite images in each period are counted and arranged in a chronological order to obtain the image characteristics of the garlic crops and the winter wheat crops in the Sentinel-1 time series synthetic aperture radar satellite images. The difference in image characteristics of the garlic crops and the winter wheat crops is as follows: from the overwintering period of the winter wheat to the tillering and booting period of the winter wheat, the pixel value of the winter wheat in the time series synthetic aperture radar satellite images (vertical transmit and vertical receive (VV) polarization images) shows a downward trend, and the garlic shows an opposite trend.

S7, A radar synthetic image data set is obtained according to the image characteristics of the garlic crops and the winter wheat crops in step S6.

According to the image characteristics of garlic and winter wheat (from the overwintering period of the winter wheat to the tillering and booting period of the winter wheat, the pixel value of winter wheat in the time series synthetic aperture radar satellite images (VV polarization images) shows a downward trend, and the garlic shows an overall upward trend), an Sentinel-1 time series image synthesis scheme is designed to eliminate redundant data and enhance the difference of the image characteristics of the garlic and the winter wheat. A method for obtaining the radar synthetic image data set is as follows: in the overwintering period of the winter wheat (Jan. 1, 2020 to Jan. 30, 2020), a median image of Sentinel-1 synthetic aperture radar satellite images is synthesized and recorded as an $SVV1_{med}$ synthetic image. In the tillering period and the booting period of the winter wheat (Apr. 1, 2020 to Apr. 30, 2020), a median image of the Sentinel-1 synthetic aperture radar satellite images is synthesized and recorded as an $SVV2_{med}$ synthetic image. The $SVV1_{med}$ synthetic image and the $SVV2_{med}$ synthetic image are combined into the radar synthetic image data set. VV represents the image in the Sentinel-1 images that is imaged by VV polarization.

S8, A decision tree model for radar image recognition of the garlic crops is constructed according to the radar synthetic image data set obtained in step S7 and the geographic coordinate information of the garlic crops obtained in step S3. A differential threshold ε and a threshold ζ are obtained according to distributions of the $SVV1_{med}$ synthetic image and the $SVV2_{med}$ synthetic image on the geographic coordinate position of the garlic crops.

The $SVV1_{med}$ synthetic image and the $SVV2_{med}$ synthetic image are subtracted to obtain a difference image, and a pixel value of the difference image at the geographic coordinate position of the garlic crops is counted, and its distribution interval is less than ε. A pixel value of the $SVV2_{med}$ synthetic image at the geographic coordinate position of the garlic crops is counted, and its distribution interval is greater than ζ. The decision tree model for radar image recognition of the garlic crops is obtained according to the differential threshold ε and the threshold ζ. In the present embodiment, ε=3 dB, and ζ=−16 dB.

Figure 3:
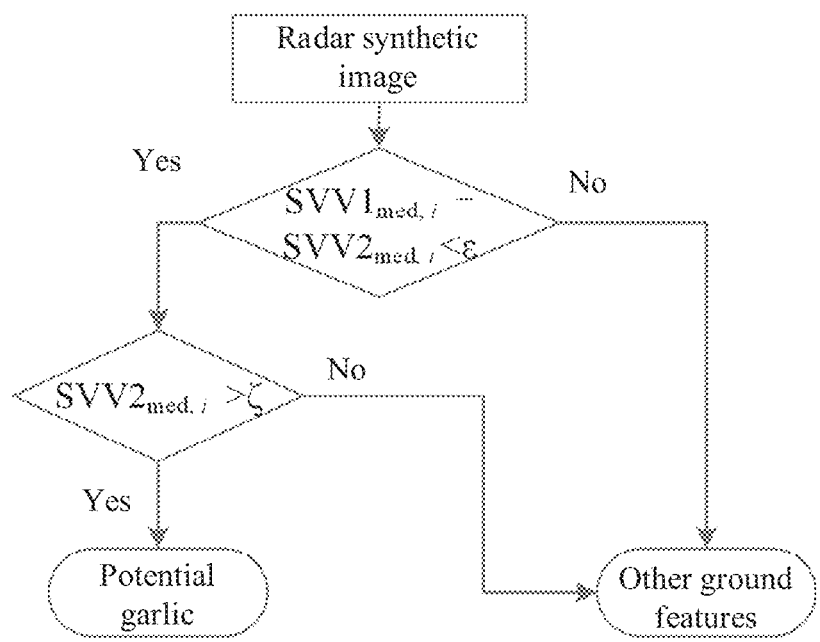
FIG. 3 is a decision tree model for radar image recognition of the garlic crops of the present invention.

S9, The radar synthetic image data set obtained in step S7 is classified according to the decision tree model for radar image recognition of the garlic crops obtained in step S8 to obtain a radar distribution diagram of the garlic crops. As shown in FIG. 3, a second constraint condition of the garlic crops, $$\begin{cases} SVV1_{med,i} - SVV2_{med,i} < \varepsilon \\ SVV2_{med,i} > \zeta \end{cases},$$

is constructed according to the decision tree model for radar image recognition of the garlic crops. Pixels in the $SVV1_{med}$ synthetic image and the $SVV2_{med}$ synthetic image are respectively screened according to the second constraint condition of the garlic crops to obtain the radar distribution diagram of the garlic crops. $SVV1_{med,i}$ represents a pixel value of an $i^{th}$ pixel in the $SVV1_{med}$ synthetic image, and $SVV2_{med,i}$ represents a pixel value of an $i^{th}$ pixel in the $SVV2_{med}$ synthetic image. The radar distribution diagram of the garlic crops is realized on the Google Earth Engine cloud computing platform.

S10, The radar distribution diagram of the garlic crops in step S9 is coupled with the optical distribution diagram of the garlic crops in step S5, i.e., an intersection of the two distribution diagrams is selected on the Google Earth Engine cloud computing platform to obtain remote sensing-based recognition results of the garlic crops. When the pixel i is the garlic crops in the radar distribution diagram of the garlic crops and the optical distribution diagram of the garlic crops, it is determined that the pixel i is the garlic crops, and otherwise, it is determined that the pixel i is not the garlic crops. All pixels in the radar distribution diagram of the garlic crops and the optical distribution diagram of the garlic crops are traversed successively to complete the final remote sensing-based recognition of the garlic crops.

Figure 4:
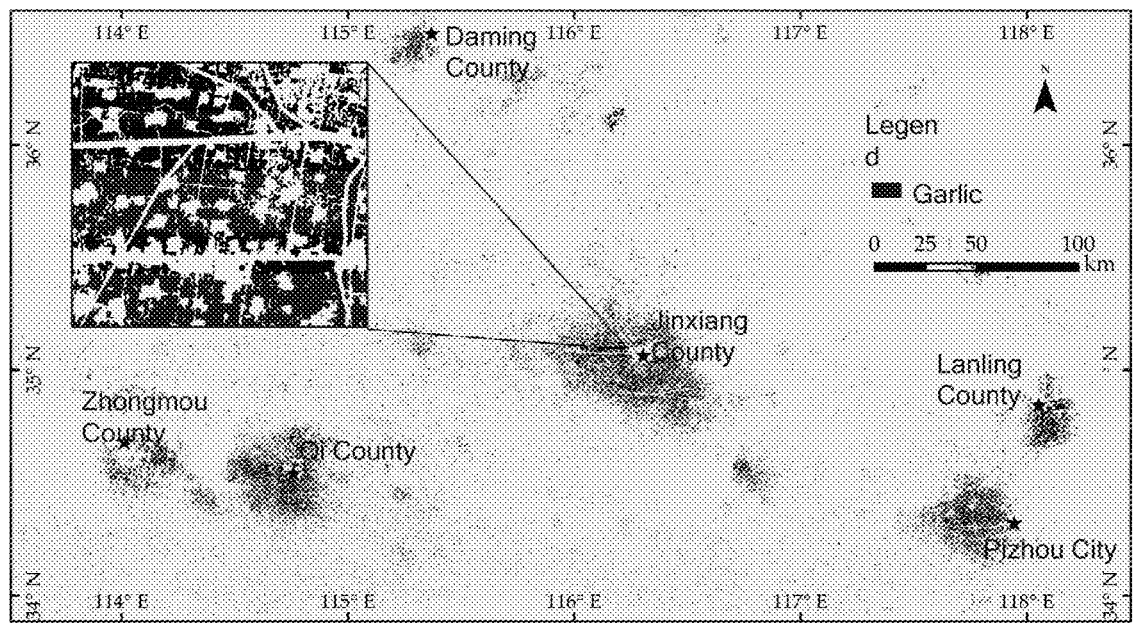
FIG. 4 is remote sensing-based recognition results of the garlic crops of the present invention.

The recognition result of the present embodiment is shown in FIG. 4. It can be seen from FIG. 4 that the main concentrated garlic planting areas in the area of the embodiment have been fully recognized, such as the concentrated garlic planting areas in Jinxiang County of Shandong, Qi County of Henan, and Pizhou City of Jiangsu. It can be seen from the partial enlarged view that the texture information such as the boundary of the garlic planting plot is complete, and other ground features such as roads can be effectively distinguished, which illustrates the reliability and accuracy of the garlic distribution recognition of the present invention.

The above description is merely the preferred embodiments of the present invention, and not intended to limit the present invention. Any modifications, equivalent replacements, improvements, etc. made within the spirit and principle of the present invention shall all fall within the protection scope of the present invention.

What is claimed is:

1. A cloud platform-based garlic crop recognition method by coupling active and passive remote sensing images, comprising the following steps:
    S1: retrieving moderate resolution imaging spectroradiometer (MODIS)-normalized difference vegetation index (NDVI) time series images of main garlic crop production areas in a target year on a Google Earth Engine cloud computing platform to obtain phenological information of garlic crops and other forest and grass vegetation according to the MODIS-NDVI time series images;
    S2: retrieving Sentinel-2 time series images and Landsat-8 time series satellite images of the main garlic crop production areas in the target year on the Google Earth Engine cloud computing platform to obtain an optically synthetic image data set by combining the phenological information of the garlic crops;
    S3: obtaining and recording geographic coordinate information of the garlic crops and winter wheat crops in the main garlic crop production areas by a hand-held global position system (GPS);
    S4: constructing a decision tree model for optical image recognition of the garlic crops based on the optically synthetic image data set obtained in step S2 and the geographic coordinate information of the garlic crops obtained in step S3;
    S5: classifying the optically synthetic image data set obtained in step S2 according to the decision tree model for the optical image recognition of the garlic crops obtained in step S4 to obtain an optical distribution diagram of the garlic crops;
    S6: retrieving Sentinel-1 time series synthetic aperture radar satellite images of the main garlic crop production areas in the target year on the Google Earth Engine cloud computing platform to obtain radar image characteristics of the garlic crops and the winter wheat crops by combining the geographic coordinate information of the garlic crops and the winter wheat crops obtained in step S3;
    S7: obtaining a radar synthetic image data set according to the radar image characteristics of the garlic crops and the winter wheat crops in step S6;
    S8: constructing a decision tree model for radar image recognition of the garlic crops according to the radar synthetic image data set obtained in step S7 and the geographic coordinate information of the garlic crops obtained in step S3;
    S9: classifying the radar synthetic image data set obtained in step S7 according to the decision tree model for the radar image recognition of the garlic crops obtained in step S8 to obtain a radar distribution diagram of the garlic crops; and
    S10: coupling the radar distribution diagram of the garlic crops in step S9 with the optical distribution diagram of the garlic crops in step S5 on the Google Earth Engine cloud computing platform to obtain remote sensing-based recognition results of the garlic crops.

2. The cloud platform-based garlic crop recognition method according to claim 1, wherein
    a method for obtaining the optically synthetic image data set comprises:
    in a time period when a time series MODIS-NDVI of the garlic crops is higher than a time series MODIS-NDVI of other forest and grass vegetation, extracting a maximum value of NDVI of the Sentinel-2 time series images at a position of a pixel i as a pixel value of the pixel i, and traversing all positions of pixels of the Sentinel-2 time series images successively to obtain a maximum value synthetic image of NDVI to be recorded as $NDVI_{max}$;
    in a time period when the time series MODIS-NDVI of the garlic crops is lower than the time series MODIS-NDVI of other forest and grass vegetation, extracting a minimum value of NDVI of the Sentinel-2 and the Landsat-8 time series images at the position of the pixel i as the pixel value of the pixel i, and traversing all the positions of the pixels of the Sentinel-2 and the Landsat-8 time series images successively to obtain a minimum value synthetic image of NDVI to be recorded as $NDVI_{min}$;
    in a time period when the time series MODIS-NDVI of the garlic crops is lower than the time series MODIS-NDVI of other forest and grass vegetation, extracting a median value of NDVI of the Sentinel-2 and the Landsat-8 time series satellite images at the position of the pixel i as the pixel value of the pixel i, and traversing all the positions of the pixels of the Sentinel-2 and the Landsat-8 time series satellite images successively to obtain a median value synthetic image of NDVI to be recorded as $NDVI_{med}$; and
    combining the maximum value synthetic image $NDVI_{max}$ of NDVI, the minimum value synthetic image $NDVI_{min}$ of NDVI, and the median value synthetic image $NDVI_{med}$ of NDVI into the optically synthetic image data set.

3. The cloud platform-based garlic crop recognition method according to claim 2, wherein
    a method for constructing the decision tree model for the optical image recognition of the garlic crops comprises:
    obtaining a threshold $\alpha$ of a median pixel value according to distribution of the median value synthetic image $NDVI_{med}$ of NDVI on a geographic coordinate position of the garlic crops;
    obtaining a first threshold $\gamma$ of a maximum pixel value and a second threshold $\beta$ of the maximum pixel value according to distribution of the maximum value synthetic image $NDVI_{max}$ of NDVI on the geographic coordinate position of the garlic crops;
    obtaining a threshold $\delta$ of a minimum pixel value according to distribution of the minimum value synthetic image $NDVI_{min}$ of NDVI on the geographic coordinate position of the garlic crops; and
    obtaining the decision tree model for the optical image recognition of the garlic crops according to the threshold $\alpha$ of the median pixel value, the first threshold $\gamma$ of the maximum pixel value, the second threshold β of the maximum pixel value and the threshold δ of the minimum pixel value.

4. The cloud platform-based garlic crop recognition method according to claim 3, wherein
a method for obtaining the optical distribution diagram of the garlic crops comprises:
constructing a first constraint condition of the garlic crops as $$\begin{cases} NDVI_{med,i} < \alpha \\ NDVI_{max,i} > \beta \\ NDVI_{min,i} < \frac{1}{2} NDVI_{max,i} \end{cases} \text{ or } \begin{cases} NDVI_{med,i} < \alpha \\ \gamma < NDVI_{max,i} \leq \beta \\ NDVI_{min,i} < \delta \end{cases}$$

according to the decision tree model for the optical image recognition of the garlic crops; and
respectively screening pixels in the maximum value synthetic image $NDVI_{max}$ of NDVI, the median value synthetic image $NDVI_{med}$ of NDVI and the minimum value synthetic image $NDVI_{min}$ of NDVI according to the first constraint condition of the garlic crops to obtain the optical distribution diagram of the garlic crops, wherein $NDVI_{max,i}$ represents a pixel value of an $i^{th}$ pixel in the maximum value synthetic image $NDVI_{max}$ of NDVI, $NDVI_{med,i}$ represents a pixel value of an $i^{th}$ pixel in the median value synthetic image $NDVI_{med}$ of NDVI, and $NDVI_{min,i}$ represents a pixel value of an $i^{th}$ pixel in the minimum value synthetic image $NDVI_{min}$ of NDVI.

5. The cloud platform-based garlic crop recognition method according to claim 4, wherein
a method for obtaining the radar synthetic image data set comprises:
in an overwintering period of the winter wheat crops, synthesizing a first median image of Sentinel-1 synthetic aperture radar satellite images to be recorded as an $SVV1_{med}$ synthetic image;
in a tillering period to a booting period of the winter wheat crops, synthesizing a second median image of the Sentinel-1 synthetic aperture radar satellite images to be recorded as an $SVV2_{med}$ synthetic image; and
combining the $SVV1_{med}$ synthetic image and the $SVV2_{med}$ synthetic image into the radar synthetic image data set.

6. The cloud platform-based garlic crop recognition method according to claim 1, wherein
a method for obtaining the radar synthetic image data set comprises:
in an overwintering period of the winter wheat crops, synthesizing a first median image of Sentinel-1 synthetic aperture radar satellite images to be recorded as an $SVV1_{med}$ synthetic image;
in a tillering period to a booting period of the winter wheat crops, synthesizing a second median image of the Sentinel-1 synthetic aperture radar satellite images to be recorded as an $SVV2_{med}$ synthetic image; and
combining the $SVV1_{med}$ synthetic image and the $SVV2_{med}$ synthetic image into the radar synthetic image data set.

7. The cloud platform-based garlic crop recognition method according to claim 6, wherein
a method for constructing the decision tree model for the radar image recognition of the garlic crops comprises:
obtaining a differential threshold ε and a threshold ζ according to distributions of the $SVV1_{med}$ synthetic image and the $SVV2_{med}$ synthetic image on a geographic coordinate position of the garlic crops; and
obtaining the decision tree model for the radar image recognition of the garlic crops according to the differential threshold ε and the threshold ζ.

8. The cloud platform-based garlic crop recognition method according to claim 7, wherein
a method for obtaining the radar distribution diagram of the garlic crops comprises:
constructing a second constraint condition of the garlic crops as $$\begin{cases} SVV1_{med,i} - SVV2_{med,i} < \varepsilon \\ SVV2_{med,i} > \zeta \end{cases}$$

according to the decision tree model for the radar image recognition of the garlic crops; and
respectively screening pixels in the $SVV1_{med}$ synthetic image and the $SVV2_{med}$ synthetic image according to the second constraint condition of the garlic crops to obtain the radar distribution diagram of the garlic crops, wherein $SVV1_{med,i}$ represents a pixel value of an $i^{th}$ pixel in the $SVV1_{med}$ synthetic image, and $SVV2_{med,i}$ represents a pixel value of an $i^{th}$ pixel in the $SVV2_{med}$ synthetic image.

9. The cloud platform-based garlic crop recognition method according to claim 8, wherein
a method for obtaining final remote sensing-based recognition results of the garlic crops comprises:
when the pixel i is the garlic crops in the radar distribution diagram of the garlic crops and the optical distribution diagram of the garlic crops, determining that the pixel i is the garlic crops;
when the pixel i is not the garlic crops in the radar distribution diagram of the garlic crops or the optical distribution diagram of the garlic crops, determining that the pixel i is not the garlic crops; and
traversing all pixels in the radar distribution diagram of the garlic crops and the optical distribution diagram of the garlic crops successively to obtain the final remote sensing-based recognition results of the garlic crops.

\* \* \* \* \*